United States Patent
Ito et al.

(10) Patent No.: US 9,722,386 B2
(45) Date of Patent: Aug. 1, 2017

(54) LASER OSCILLATOR COMPRISING HEAT EXCHANGER HAVING FUNCTION OF COLLECTING FOREIGN MATTERS

(71) Applicant: FANUC CORPORATION, Minamitsuru-gun, Yamanashi (JP)

(72) Inventors: Risa Ito, Yamanashi (JP); Tetsuhisa Takazane, Yamanashi (JP); Yuji Nishikawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/264,985

(22) Filed: Sep. 14, 2016

(65) Prior Publication Data

US 2017/0077666 A1 Mar. 16, 2017

(30) Foreign Application Priority Data

Sep. 15, 2015 (JP) ................. 2015-181686

(51) Int. Cl.
| | |
|---|---|
| H01S 3/06 | (2006.01) |
| H01S 3/041 | (2006.01) |
| H01S 3/036 | (2006.01) |
| H01S 3/04 | (2006.01) |
| H01S 3/22 | (2006.01) |
| H01S 3/104 | (2006.01) |
| H01S 3/223 | (2006.01) |
| H01S 3/097 | (2006.01) |

(52) U.S. Cl.
CPC ............ *H01S 3/041* (2013.01); *H01S 3/036* (2013.01); *H01S 3/04* (2013.01); *H01S 3/0405* (2013.01); *H01S 3/097* (2013.01); *H01S 3/104* (2013.01); *H01S 3/22* (2013.01); *H01S 3/2232* (2013.01)

(58) Field of Classification Search
CPC . H01S 3/041; H01S 3/04; H01S 3/036; H01S 3/0405; H01S 3/097; H01S 3/104; H01S 3/22; H01S 3/2232
See application file for complete search history.

(56) References Cited

U.S. PATENT DOCUMENTS

| | | | | |
|---|---|---|---|---|
| 4,737,963 A | * | 4/1988 | Koseki | .............. H01S 3/036 372/58 |
| 2003/0179797 A1 | * | 9/2003 | Egawa | ............... H01S 3/03 372/58 |
| 2008/0056325 A1 | * | 3/2008 | Ohta | ............... H01S 3/036 372/58 |
| 2010/0107870 A1 | * | 5/2010 | Morton | .............. B03C 3/06 95/69 |

FOREIGN PATENT DOCUMENTS

| | | |
|---|---|---|
| JP | 2003-283008 A | 10/2003 |
| JP | 2006-116472 A | 5/2006 |

* cited by examiner

*Primary Examiner* — Kinam Park
(74) *Attorney, Agent, or Firm* — RatnerPrestia

(57) ABSTRACT

A laser oscillator comprises a heat exchanger which cools a gas medium. The heat exchanger includes a cooling part which performs heat exchange between the gas medium and a cooling medium, a tubular member fixed to a frame body, and a foreign matter collection container. The tubular member is disposed so that the gas medium which flows out of the cooling part moves along an outer surface of the tubular member and then changes a proceeding direction to flow into an inlet portion. The foreign matter collection container collects foreign matters which are separated from a flow of the gas medium.

4 Claims, 3 Drawing Sheets

LASER OSCILLATOR COMPRISING HEAT EXCHANGER HAVING FUNCTION OF COLLECTING FOREIGN MATTERS

BACKGROUND OF THE INVENTION

1. Field of the Invention

The present invention relates to a laser oscillator comprising a heat exchanger which cools a gas medium.

2. Description of the Related Art

In a gas laser oscillator using a gas medium, such as a carbon dioxide gas laser oscillator, the gas medium circulates at a high speed. In the gas laser oscillator, foreign matters may be mixed in the gas medium. The foreign matters include fine dust, dirt, or a particle which is mixed in during assembly, a quartz powder produced due to an excitation electric discharge in an electric discharge tube, an abrasion powder of a wall surface of a gas flow channel which is produced due to the gas medium circulating at a high speed, and the like.

A surface of a partial reflection mirror and a total reflection mirror which constitute the oscillator is subjected to coating which contributes to oscillation of laser light. When the foreign matters adhere to a surface of an optical component, such as the partial reflection mirror and the total reflection mirror, the laser light is absorbed and heat is generated. Further, it is liable to cause reduction of a laser output, deterioration of the optical components due to burning of the foreign matters, and the like. Accordingly, a dust collector which separates and collects a particulate material from the gas medium is attached to the gas laser oscillator. For the dust collector, a type such as a cyclone type is adopted. In a cyclone type dust collector, dust and dirt contained in the gas medium can be centrifugally separated by swirling a gas.

Japanese Laid-open Patent Publication No. 2003-283008 discloses a laser oscillator comprising a dust collection mechanism which collects particulate foreign matters in a gas medium. In the dust collection mechanism, a gas medium containing the particulate foreign matters moves in the interior of a tube of a swirl part from top to bottom while swirling. In the meantime, the foreign matters having a greater specific gravity in comparison with the gas medium are centrifugally separated and fall down to a dust collection part to be heaped up.

In the laser oscillator in which the gas medium circulates, a remaining energy which has not been converted into laser light out of an energy which has excited the gas medium by an electric discharge and the like turns into heat of the gas medium. Further, when the gas medium is compressed by a blower, a temperature increases. To the laser oscillator, a heat exchanger is attached to cool the gas medium having the temperature increased due to an electric discharge and a drive of the blower.

Japanese Laid-open Patent Publication No. 2006-116472 discloses a cyclone comprising a heat exchanger. This publication discloses disposing a jacket which makes the gas to flow around an outer periphery of a tubular casing and performing heat exchange between the gas introduced into the jacket and an exhaust gas having a high temperature.

When the foreign matters adhere to the surface of the optical component and the laser output decreases, the optical component is detached and cleaning is performed. Alternatively, the optical component needs to be replaced. When the optical component is attached again, a skilled technique and a large amount of time are needed for light axis adjustment and the like. In addition, in a laser having a large output, when the laser light is radiated over the optical component to which the foreign matters adhere, the foreign matters are burned. Further, the foreign matters absorb the laser light and a temperature locally increases so that a coating of the optical component may be damaged. Also in this case, replacing the optical component is needed, and a skilled technique and a large amount of time are needed. Thus, the foreign matters are preferably removed as much as possible from the gas medium.

Further, a dust collection unit and a heat exchanger which are provided to the laser oscillator in which the gas medium circulates at a high speed are large and expensive. In the laser oscillator disclosed in Japanese Laid-open Patent Publication No. 2003-283008, a heat exchanger and a dust collector are separately disposed. Accordingly, a large space in which the heat exchanger and the dust collector are disposed is needed. Further, a tube for connection of the heat exchanger and the dust collector is needed so that a space in which the tube is disposed is needed. In addition, an operation for connection of the heat exchanger and the dust collector is needed. The cyclone disclosed in Japanese Laid-open Patent Publication No. 2006-116472 has a function of cooling a gas. However, in a structure in which the jacket which makes the gas to flow around the outer periphery of the tubular casing is disposed, a gas cooling ability is low.

SUMMARY OF INVENTION

A laser oscillator of the present invention comprises a gas flow channel through which a gas medium which amplifies laser light circulates, a blower which is disposed at the gas flow channel and makes the gas medium to circulate, and a heat exchanger which is disposed at the gas flow channel and cools the gas medium. The heat exchanger includes a frame body, a cooling part which performs heat exchange between the gas medium and a cooling medium, a tubular member fixed to the frame body, and a foreign matter collection container which collects foreign matters contained in the gas medium. The tubular member has an inlet portion of an interior flow channel communicating with an interior space of the frame body and an outlet portion of the interior flow channel connected to the gas flow channel. The cooling part is disposed so that the gas medium flowing out of the cooling part flows toward an outer surface of the tubular member. The tubular member is disposed so that the gas medium which flows out of the cooling part moves along the outer surface of the tubular member and then changes a proceeding direction to flow into the inlet portion. The foreign matter collection container is disposed at a location to face the inlet portion of the tubular member and formed to be capable of collecting the foreign matters separated from a flow of the gas medium.

In the invention as described above, the cooling part can have a structure in which a gas medium flow part formed into a plate shape and a cooling medium flow part formed into a plate shape are alternately stacked.

In the invention as described above, the frame body of the heat exchanger can include two or more suction ports of the gas medium, and the tubular member can be formed into a cylindrical shape and include a swirl promotion part which makes the gas medium to swirl on an outer surface.

In the invention as described above, the foreign matter collection container can include a scattering restraint member for restraining scattering of the foreign matters, and further, can be formed to be detachable from the frame body.

DETAILED DESCRIPTION

A laser oscillator according to an embodiment will be described with reference to FIGS. 1 to 5. The laser oscillator according to the present embodiment is a gas laser oscillator which excites light by a gas medium.

Figure 1:
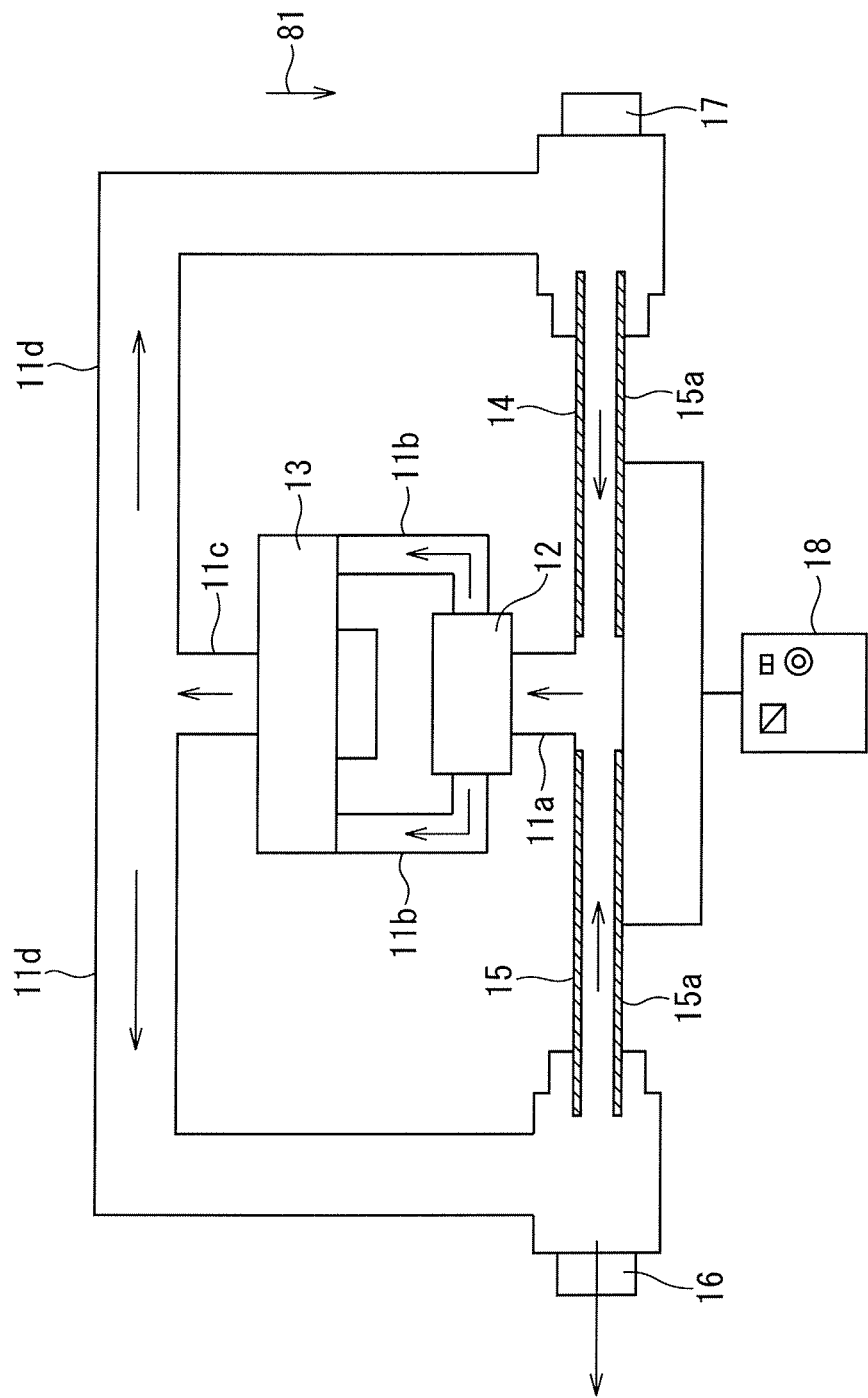
FIG. 1 is a schematic diagram of a laser oscillator according to an embodiment.

FIG. 1 shows a schematic diagram of the laser oscillator according to the present embodiment. A laser oscillator 1 comprises an optical resonator 14 which excites light and gas flow channels 11a to 11d through which a gas medium is made to circulate. The laser oscillator 1 comprises a blower 12 which supplies the gas medium to the gas flow channels 11a to 11d. The blower 12 is driven, whereby the gas medium circulates through the gas flow channels 11a to 11d. Further, the laser oscillator 1 comprises a heat exchanger 13 which is disposed at the gas flow channels and cools the gas medium. The heat exchanger 13 can be disposed at any location of the gas flow channels.

The optical resonator 14 includes an electric discharge tube 15 which makes an electric discharge of the gas medium to occur, a partial reflection mirror 16, and a total reflection mirror 17. The partial reflection mirror 16 and the total reflection mirror 17 are optical components disposed at end portions of the electric discharge tube 15 at both sides. In the optical resonator 14, light is resonated by the partial reflection mirror 16 and the total reflection mirror 17. The electric discharge tube 15 includes an electric discharge electrode 15a which electrically discharges the gas medium. The electric discharge electrode 15a is connected to a power source unit 18. The power source unit 18 makes the electric discharge to occur in the interior of the electric discharge tube 15 by, for example, supplying a high frequency electric power.

Laser light reciprocally moves in the gas medium excited in the interior of the electric discharge tube 15 so that an output of the laser light is increased. The laser light is partially taken out from the partial reflection mirror 16. Such laser light can be used for metal processing and resin processing.

The blower 12 has a function of circulating the gas medium at a high speed. The heat exchanger 13 removes compression heat generated when a gas is compressed by the blower. Alternatively, the heat exchanger 13 removes heat generated due to the electric discharge.

The gas medium electrically discharged in the electric discharge tube 15 of the optical resonator 14 flows through the gas flow channel 11a into the blower 12. In the blower 12, the gas medium is pressurized. The gas medium flowing out of the blower 12 flows through the gas flow channels 11b into the heat exchanger 13. In the present embodiment, the plurality of gas flow channels 11b are formed. In the heat exchanger 13, the gas medium is cooled. The gas medium flowing out of the heat exchanger 13 flows through the gas flow channel 11c into the gas flow channel 11d. The gas medium is supplied through the gas flow channel 11d to the electric discharge tube 15 of the optical resonator 14. Thus, the gas medium circulates in the interior of the laser oscillator 1.

Figure 2:
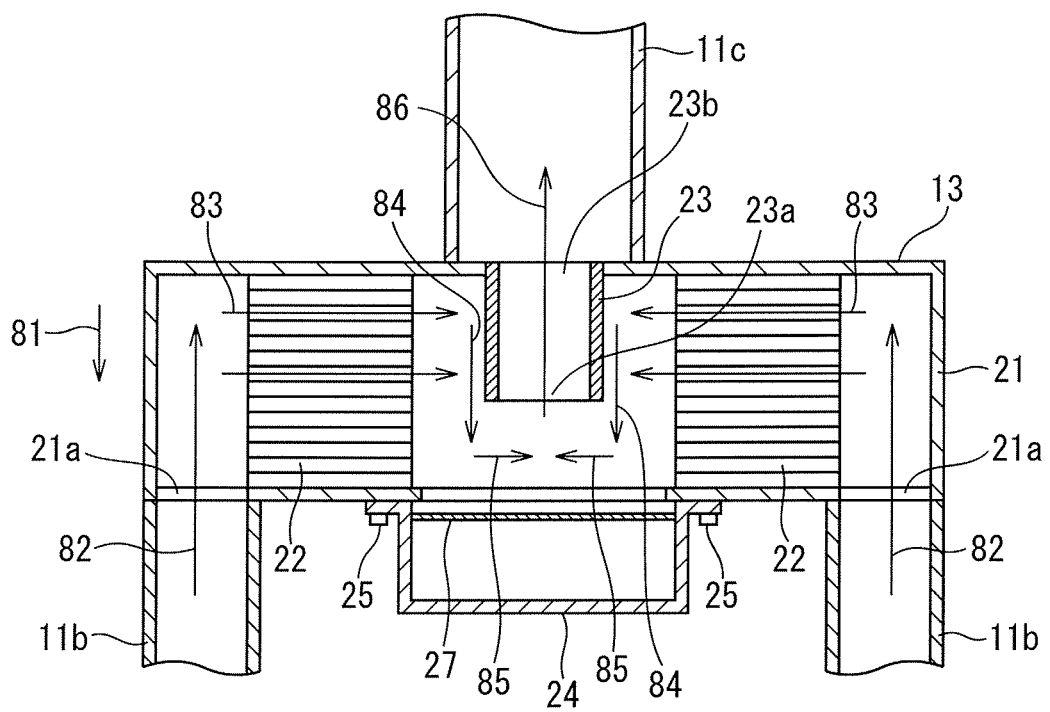
FIG. 2 is a schematic cross-sectional view of a heat exchanger according to the embodiment.

FIG. 2 shows a schematic cross-sectional view of the heat exchanger according to the present embodiment. The heat exchanger 13 according to the present embodiment is a plate type heat exchanger. The heat exchanger 13 includes a frame body 21 serving as an outside casing and a cooling part 22 which performs heat exchange between the gas medium and a cooling medium. The heat exchanger 13 includes a tubular member 23 fixed to the frame body and a foreign matter collection container 24 which collects foreign matters contained in the gas medium.

The tubular member 23 in the present embodiment is formed into a cylindrical shape. In the tubular member 23, an interior space serves as a gas flow channel. In the tubular member 23, an inlet portion 23a of the gas flow channel communicates with an interior space of the frame body 21. In addition, an outlet portion 23b of an interior flow channel of the tubular member 23 is connected to the gas flow channel 11c. The tubular member 23 in the present embodiment is disposed at a substantially center portion in a planar shape of the frame body 21.

Figure 3:
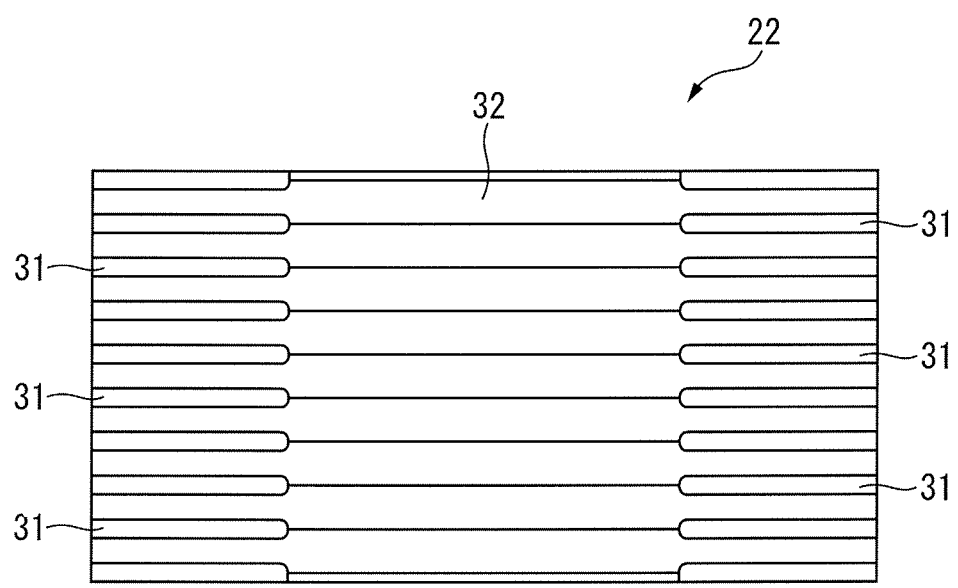
FIG. 3 is an enlarged schematic cross-sectional view of a cooling part of the heat exchanger according to the embodiment.

FIG. 3 shows an enlarged schematic cross-sectional view of the cooling part in the present embodiment. The cooling part 22 has a structure in which a layer for a low temperature fluid and a layer for a high temperature fluid are stacked. The cooling part 22 in the present embodiment is formed into a rectangular parallelepiped shape. The cooling part 22 includes a gas medium flow part 31 through which the gas medium flows and a cooling medium flow part 32 through which the cooling medium flows. The cooling part 22 is structured by alternately stacking the gas medium flow part 31 and the cooling medium flow part 32. In addition, in the cooling part 22 in the present embodiment, the gas medium flow part 31 and the cooling medium flow part 32 are formed into a plate shape so as to thinly extend. The gas medium proceeds along a direction in which the gas medium flow part 31 extends. In an example as illustrated in FIG. 3, in the gas medium flow part 31, the gas medium flows in a direction vertical to the sheet.

In the cooling part 22 in the present embodiment, the plurality of gas medium flow parts 31 are formed. As the cooling part 22, the embodiment is not limited to this, and the single gas medium flow part 31 for the single cooling part 22 may be formed. Further, in the present embodiment, the cooling parts 22 are disposed at both sides of the tubular member 23 so as to sandwich the tubular member 23. In the frame body 21, a plurality of suction ports 21a of the gas medium are formed in accordance with the number of cooling parts 22. In the present embodiment, in the frame body 21, the two suction ports 21a of the gas medium are formed.

The cooling medium flow part 32 is connected to a cooling medium supply device. The cooling medium supply device has a function of cooling the cooling medium. The cooling medium supply device is formed so as to continuously supply the cooling medium to the cooling medium flow part 32.

With reference to FIG. 2, the foreign matter collection container 24 is disposed at a location to face the inlet portion 23a of the tubular member 23. Between the foreign matter collection container 24 and the inlet portion 23a of the tubular member 23, a space is formed. The foreign matter collection container 24 is fixed to the frame body 21 by a bolt 25 serving as a fastening member. The foreign matter collection container 24 is formed so as to be capable of being detached from the frame body 21 by loosening the bolt 25. Thus, the foreign matter collection container 24 is formed to be detachable from the frame body 21. By detaching the foreign matter collection container 24 from the frame body 21, the foreign matters collected in the foreign matter collection container 24 can be easily discarded.

The cooling part 22 in the present embodiment is disposed so that the gas medium flowing out of the cooling part 22 flows toward an outer surface of the tubular member 23. In other words, the cooling part 22 is disposed so that an extending direction of the gas medium flow part 31 is substantially vertical to an axial line of the tubular member 23. The tubular member 23 is disposed adjacent to the cooling part 22 so that the gas medium flowing out of the cooling part 22 collides with the outer surface of the tubular member 23. In the present embodiment, the gas medium flows from the two cooling parts 22 toward the tubular member 23.

An arrow 81 indicates a downward direction in a vertical direction. As indicated by an arrow 82, the gas medium flows through the gas flow channel 11b into the cooling part 22. As indicated by an arrow 83, the gas medium is cooled by flowing through the cooling part 22. The gas medium which flows out of the cooling part 22 collides with the outer surface of the tubular member 23 to change a direction. In an example as illustrated in FIG. 2, the gas medium changes a movement direction from a lateral direction (direction of the arrow 83) to a downward direction (direction of an arrow 84). The gas medium moves along the outer surface of the tubular member 23. Then, as indicated by an arrow 85, the gas medium changes the direction in the vicinity of the inlet portion 23a of the tubular member 23. In the example as illustrated in FIG. 2, the gas medium changes a proceeding direction to the lateral direction, and then flows into the inlet portion 23a of the tubular member 23. Then, as indicated by an arrow 86, the gas medium flows through the interior of the tubular member 23 and flows out to the gas flow channel 11c.

At a part at which the proceeding direction of the gas medium turns round, the foreign matters are shaken off by the inertial force or the centrifugal force. In other words, the foreign matters are separated from a flow of the gas medium. In particular, when the proceeding direction of the gas medium changes from downward to upward, the foreign matters are shaken off from the gas medium by the inertial force and gravitational operations. The foreign matters shaken off from the gas medium are collected by the foreign matter collection container 24.

In the heat exchanger 13 in the present embodiment, the gas medium flows out from the plurality of cooling parts 22 disposed at side of the tubular member 23 toward the tubular member 23. In the interior of the frame body 21, the flow of the gas medium toward a plurality of direction is generated. The gas medium flowing in the plurality of directions is made to collide with each other, and further, a swirl promotion part is provided, whereby a swirl flow can be formed. In this case, the centrifugal force in addition to the inertial force and gravitational operations is applied to the foreign matters. As a result, the foreign matters can be deviated from the flow of the gas medium and collected in an efficient manner.

Thus, the heat exchanger in the present embodiment has a function of collecting dust in addition to a heat exchange function. In addition, the heat exchanger in the present embodiment has a configuration in which the cooling part and a dust collector are integrated with each other. Consequently, a tube for connection of the heat exchanger and the dust collector is unneeded. Constitution components constituting the laser oscillator can be reduced. As a result, an operation needed to manufacture and assemble members can be reduced. Alternatively, the laser oscillator can be small-sized.

The cooling part of the heat exchanger in the present embodiment adopts a plate type cooling part (heat exchange part). In the plate type cooling part, an area in which the gas medium adjoins a cooling fluid through a partition wall is large. Accordingly, the plate type cooling part has a high heat exchange ability. Note that, as the cooling medium, any of the gas or the fluid can be adopted. In the plate type cooling part, the number of plates to be stacked and the space of layers can be changed in accordance with a laser output. Consequently, the heat exchanger having proper heat exchange ability can be easily configured in accordance with the laser output. By adopting heat exchanger in the present embodiment, the small-sized laser oscillator having high heat exchange ability and collecting function can be formed.

Further, in the present embodiment, the gas medium flows through the layered gas medium flow part 31 in the cooling part 22, whereby the gas medium is straightened. Consequently, the proceeding direction of the gas medium can be smoothly changed. In addition, when the swirl promotion part is provided and the gas medium swirls around the tubular member 23, a smooth swirl around the tubular member 23 can be made.

Figure 4:
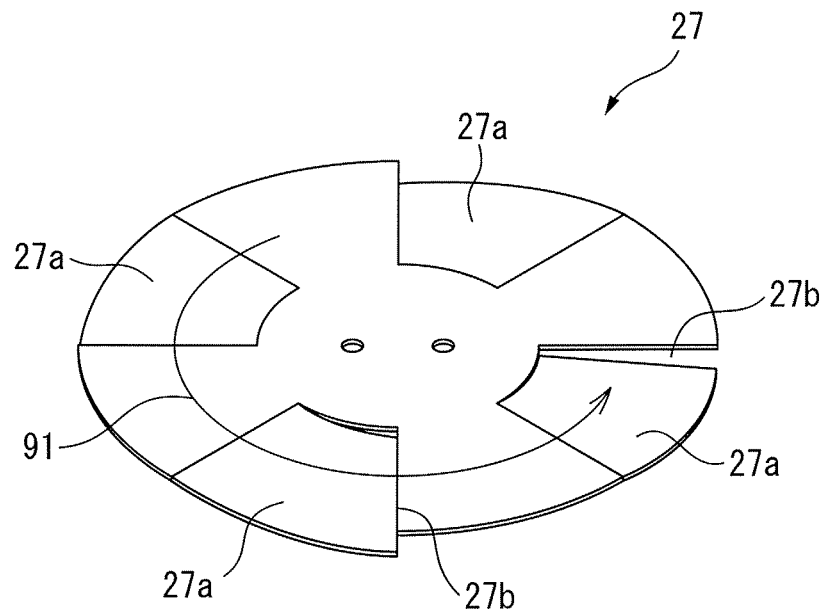
FIG. 4 is a perspective view of a scattering restraint plate according to the embodiment.

FIG. 4 shows a perspective view of a scattering restraint plate of the foreign matter collection container according to the present embodiment. With reference to FIGS. 2 and 4, the foreign matter collection container 24 includes a scattering restraint plate 27 serving as a scattering restraint member for restraining the foreign matters collected in the interior of the foreign matter collection container 24 from scattering again. The scattering restraint plate 27 in the present embodiment is formed into a circular plate shape. The scattering restraint plate 27 functions as a cover of the foreign matter collection container 24.

The scattering restraint plate 27 includes a slit portion 27b which is an opening portion extending in a thin and long manner. The slit portion 27b in the present embodiment is formed so as to extend in a radial direction of the scattering restraint plate 27. The scattering restraint plate 27 includes a slant portion 27a in which a height gradually decreases along a circumferential direction as indicated by an arrow 91. At an end portion of the slant portion 27a, the slit portion 27b is formed. The slant portion 27a and the slit portion 27b can be formed by cutting and folding a part of the circular plate.

The tubular member 23 in the present embodiment is formed into a cylindrical shape. The gas medium flows along the outer surface of the tubular member 23, and when the gas medium changes the direction to flow into the inlet portion of the tubular member, the foreign matters fall down onto a surface of the scattering restraint plate 27. In the scattering restraint plate 27 of the present embodiment, as indicated by the arrow 91, the foreign matters such as dust and dirt move on the surface along the flow of the gas medium. Then, the foreign matters fall down from the slit portion 27b into the interior of the foreign matter collection container 24.

In the foreign matter collection container 24, since the scattering restraint plate 27 is disposed, the interior of the foreign matter collection container 24 is a closed space and a large flow of the gas medium is not generated in the interior. In addition, since an upper portion of the foreign matter collection container 24 is covered by the scattering restraint plate 27, the foreign matters can be restrained from flowing out of the foreign matter collection container 24. Further, the scattering restraint plate 27 is formed into a plate shape so as to have a characteristic in which the foreign matters hardly adhere to the surface. Thus, the foreign matter collection container 24 includes the scattering restraint plate 27, whereby the foreign matters can be effectively restrained from scattering again out of the foreign matter collection container 24. As a scattering restraint member, the scattering restraint plate is not limitative, and any member which restrains scattering of the foreign matters may be adopted. For example, as the scattering restraint member, an adsorbent which adsorbs the foreign matters may be disposed in the interior of the foreign matter collection container.

In addition, the slit portion 27b of the scattering restraint plate 27 is formed so as to extend in the radial direction, whereby the foreign matters moving in the circumferential direction are made to efficiently drop into the interior of the foreign matter collection container 24. Further, the scattering restraint plate 27 includes the slant portion 27a in which the height gradually decreases along the circumferential direction, whereby the foreign matters can be efficiently guided to the slit portion 27b. Note that the number and an extending direction of the slit portions can be formed in any embodiment. For example, the scattering restraint plate may be a plate-shaped member which has round holes for dropping the foreign matters down are formed with a predetermined space therebetween.

The tubular member in the present embodiment has a cylindrical shape having a circular cross-sectional shape, but the embodiment is not limited to this, and the cross-sectional shape may be formed in another shape, such as a square.

Figure 5:
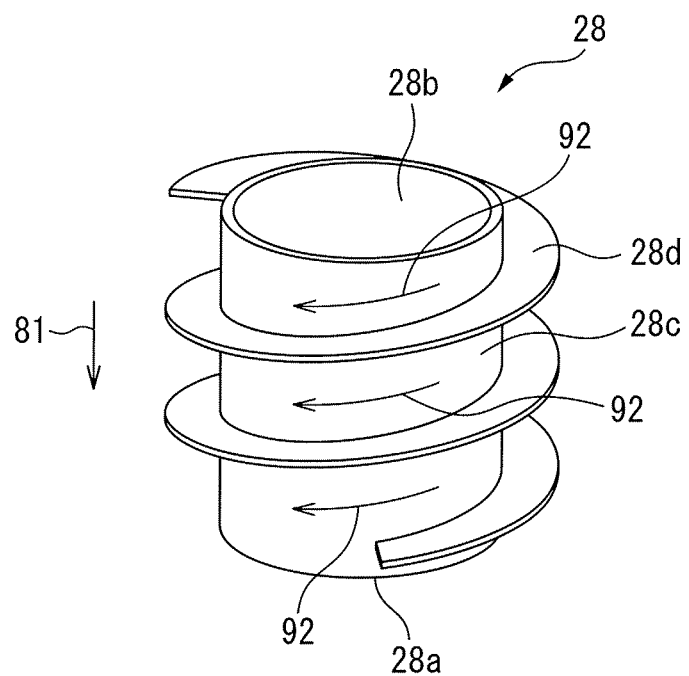
FIG. 5 is a perspective view of another tubular member according to the embodiment.

FIG. 5 shows a perspective view of another tubular member in the present embodiment. Another tubular member 28 includes a main body portion 28c formed into a cylindrical shape and a guide portion 28d which guides a flow direction of the gas medium. The guide portion 28d is formed into a plate shape and fixed to the main body portion 28c. The guide portion 28d is formed so as to stand from an outer surface of the main body portion 28c. The guide portion 28d is fixed to the main body portion 28c in a spiral manner. The guide portion 28d functions as the swirl promotion part which makes the gas medium to swirl.

With reference to FIGS. 2 and 5, in the heat exchanger 13 in the present embodiment, the gas medium flowing out of the cooling part 22 flows toward the outer surface of the tubular member 28. As indicated by an arrow 92, the gas medium is guided so as to flow along an extending direction of the guide portion 28d. Around the main body portion 28c, a swirl flow is generated in a direction from an outlet portion 28b toward an inlet portion 28a. As a result, the centrifugal force in addition to the inertial force is applied to the foreign matters. Consequently, the foreign matters can be further efficiently removed from the gas medium.

The heat exchanger 13 in the present embodiment is disposed so that an extending direction of the tubular member 23 is parallel to the vertical direction. The inlet portion 23a of the tubular member 23 is disposed at a lower side in the vertical direction and the outlet portion 23b is disposed at an upper side in the vertical direction. Since this configuration is adopted, the foreign matters such as dust and dirt can be guided to the foreign matter collection container 24 by gravitational operations in addition to inertial operations when the gas medium changes the direction in the vicinity of the inlet portion 23a.

Note that the heat exchanger 13 can be disposed so that the extending direction of the tubular member 23 is in any direction. For example, the heat exchanger 13 may be disposed so that the tubular member 23 extends in a horizontal direction.

The cooling part in the present embodiment is configured by the plate type heat exchanger, but the embodiment is not limited to this, and the cooling part may adopt any configuration in which heat exchange between the gas medium and the cooling medium can be performed. For example, as the cooling part, a multi-tube type heat exchange part including a plurality of tubes through which the cooling medium flows may be adopted.

According to the present invention, the laser oscillator comprising the heat exchanger having a function of collecting the foreign matters can be provided.

The embodiments as described above can be appropriately combined. In each of the drawings as described above, identical numerals refer to identical or corresponding parts. Note that the embodiments as described above are illustrative and are not to limit the invention. Moreover, in the embodiment, modifications of the embodiments recited in the claims are included.

The invention claimed is:

1. A laser oscillator comprising:
a gas flow channel through which a gas medium which amplifies light circulates;
a blower which is disposed at the gas flow channel and makes the gas medium to circulate; and
a heat exchanger which is disposed at the gas flow channel and cools the gas medium; wherein
the heat exchanger includes a frame body, a cooling part which performs heat exchange between the gas medium and a cooling medium, a tubular member fixed to the frame body, and a foreign matter collection container which collects the foreign matter contained in the gas medium,
the tubular member has an inlet portion of an interior flow channel communicating with an interior space of the frame body and an outlet portion of the interior flow channel connected to the gas flow channel,
the cooling part is disposed so that the gas medium flowing out of the cooling part flows toward an outer surface of the tubular member,
the tubular member is disposed so that the gas medium which flows out of the cooling part moves along the outer surface of the tubular member and then changes a proceeding direction to flow into the inlet portion, and
the foreign matter collection container is disposed at a location to face the inlet portion of the tubular member and formed to be capable of collecting the foreign matters separated from a flow of the gas medium.

2. The laser oscillator according to claim 1, wherein the cooling part has a structure in which a gas medium flow part formed into a plate shape and a cooling medium flow part formed into a plate shape are alternately stacked.

3. The laser oscillator according to claim 1, wherein
the frame body of the heat exchanger includes two or more suction ports of the gas medium, and
the tubular member is formed into a cylindrical shape and includes a swirl promotion part which makes the gas medium to swirl on an outer surface.

4. The laser oscillator according to claim 1, wherein the foreign matter collection container includes a scattering restraint member for restraining scattering of the foreign matters, and further, is formed to be detachable from the frame body.

* * * * *